(12) United States Patent
Wang (10) Patent No.: US 10,645,445 B2
(45) Date of Patent: May 5, 2020

(54) BARRAGE VIDEO LIVE BROADCAST METHOD AND APPARATUS, VIDEO SOURCE DEVICE, AND NETWORK ACCESS DEVICE

(71) Applicant: Tencent Technology (Shenzhen) Company Limited, Shenzhen (CN)

(72) Inventor: Dafeng Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/690,066

(22) Filed: Aug. 29, 2017

(65) Prior Publication Data
US 2017/0359619 A1  Dec. 14, 2017

Related U.S. Application Data

(63) Continuation-in-part of application No. PCT/CN2016/086620, filed on Jun. 21, 2016.

(30) Foreign Application Priority Data

Jul. 31, 2015 (CN) .......................... 2015 1 0466781

(51) Int. Cl.
*H04N 21/4363* (2011.01)
*H04N 21/422* (2011.01)
(Continued)

(52) U.S. Cl.
CPC ... *H04N 21/43637* (2013.01); *H04N 21/2187* (2013.01); *H04N 21/4223* (2013.01);
(Continued)

(58) Field of Classification Search
CPC ......... H04N 21/2187; H04N 21/43637; H04N 21/4788
(Continued)

(56) References Cited

U.S. PATENT DOCUMENTS 9,009,805 B1 * 4/2015 Kirkby ............... G06K 9/00711
726/7
9,769,368 B1 * 9/2017 Morford ............ H04N 5/23206
(Continued)

FOREIGN PATENT DOCUMENTS

| CN | 101819711 A | 9/2010 |
|---|---|---|
| CN | 101945096 A | 1/2011 |

(Continued)

OTHER PUBLICATIONS

Tencent Technology, ISR, PCT/2016/086620, Sep. 22, 2016, 3 pgs.
(Continued)

*Primary Examiner* — Nasser M Goodarzi
*Assistant Examiner* — Jaycee Imperial
(74) *Attorney, Agent, or Firm* — Morgan, Lewis & Bockius LLP (57) ABSTRACT

A barrage video live broadcast method is performed at a video source device that is communicatively connected to a network access device and a video capture device. The video source device sends an account distribution request to the network access device and the account distribution request is used to instruct the network access device to return a video source device account bound to the network access device for accessing a barrage video system hosted at a remote server. The video source device then obtains a live video stream captured by the video capture device (e.g., a unmanned aerial vehicle) and sends the live video stream to the network access device by using a Wi-Fi Direction connection. The network access device then forwards the
(Continued)

live video stream to the barrage video system for broadcasting the live video stream and live comments submitted from other user accounts of the barrage video system.

20 Claims, 5 Drawing Sheets

(51) Int. Cl.
  *H04N 21/4223* (2011.01)
  *H04W 76/14* (2018.01)
  *H04W 4/80* (2018.01)
  *H04N 21/2187* (2011.01)
  *H04N 21/4788* (2011.01)

(52) U.S. Cl.
  CPC ... *H04N 21/42203* (2013.01); *H04N 21/4788* (2013.01); *H04W 4/80* (2018.02); *H04W 76/14* (2018.02)

(58) Field of Classification Search
  USPC .......................................................... 725/110
  See application file for complete search history.

(56) References Cited

U.S. PATENT DOCUMENTS

| | | | | |
|---|---|---|---|---|
| 2010/0242074 A1* | 9/2010 | Rouse | ..................... | H04L 51/32 725/100 |
| 2013/0117261 A1* | 5/2013 | Sambrani | ............ | G06F 16/9535 707/734 |
| 2013/0347046 A1* | 12/2013 | Bluvband | ............... | G06F 3/005 725/109 |
| 2015/0135234 A1* | 5/2015 | Hall | .................... | H04N 21/4316 725/59 |
| 2015/0304697 A1* | 10/2015 | Trombetta | .............. | A63F 13/00 725/116 |
| 2016/0034574 A1* | 2/2016 | Kang | .................... | G06F 3/0482 715/720 |
| 2016/0321913 A1* | 11/2016 | Lin | ......................... | H04W 4/80 |
| 2017/0012950 A1* | 1/2017 | Kim | .................... | H04L 63/0442 |
| 2017/0018193 A1* | 1/2017 | Gordon | ................ | G08G 5/0069 |

FOREIGN PATENT DOCUMENTS

| | | |
|---|---|---|
| CN | 102646309 A | 8/2012 |
| CN | 102811368 A | 12/2012 |
| CN | 103312906 A | 9/2013 |
| CN | 103347209 A | 10/2013 |
| CN | 103905790 A | 7/2014 |
| CN | 104053014 A | 9/2014 |
| CN | 104581221 A | 4/2015 |
| WO | WO 2008138407 A1 | 11/2008 |

OTHER PUBLICATIONS

Tencent Technology, Written Opinion, PCT/CN2016/086620, dated Sep. 22, 2016, 3 pgs.

Tencent Technology, IPRP, PCT/CN2016/086620, Feb. 6, 2018, 4 pgs.

* cited by examiner

BARRAGE VIDEO LIVE BROADCAST METHOD AND APPARATUS, VIDEO SOURCE DEVICE, AND NETWORK ACCESS DEVICE

RELATED APPLICATIONS

This application is a continuation-in-part application of PCT/CN2016/086620, entitled "LIVE-COMMENT VIDEO LIVE BROADCAST METHOD AND APPARATUS, VIDEO SOURCE DEVICE, AND NETWORK ACCESS DEVICE" filed on Jun. 21, 2016, which claims priority to Chinese Patent Application No. 201510466781.8, filed with the State Intellectual Property Office of the People's Republic of China on Jul. 31, 2015, and entitled "LIVE-COMMENT VIDEO LIVE BROADCAST METHOD AND APPARATUS, VIDEO SOURCE DEVICE, AND NETWORK ACCESS DEVICE", both of which are incorporated herein by reference in their entirety.

FIELD OF THE TECHNOLOGY

Embodiments of the present disclosure relate to the field of Internet of Things application technologies, and particular to a barrage video live broadcast method and apparatus, a video source device, and a network access device.

BACKGROUND OF THE DISCLOSURE

Barrage video live broadcast is an emerging live video streaming service mode, which allows viewers' typed comments or voice interaction to zoom across the screen like bullets among viewers while watching the live video streaming contents to improve watching experience of the viewers.

In the existing technology, during live broadcast of a barrage video, a camera device connected to a network takes a video and uploads the video to a barrage system without a significant delay. Viewers obtain and play the live video streaming contents from the barrage system by using a video play device connected to a network in real time. At the same time, the viewers may also send typed comments or voice interactions as barrages for the played live video, to implement real-time barrage interaction.

A fixed or regular video capture device such as a camera needs to set up a communication connection between the video capture device and the live video broadcasting system in advance to access a live video broadcasting network and send live video to implement broadcast of a live video with barrage now, which severely limits application scenarios of barrage video live broadcast.

SUMMARY

To resolve a problem that the related technology severely limits application scenarios of barrage video live broadcast, embodiments of the present disclosure provide a barrage video live broadcast method and apparatus, a video source device, and a network access device. The technical solutions are as follows:

According to one of the embodiments, a barrage video live broadcast method is provided, used in a video source device, and including:

establishing a first short-range wireless communications connection to a network access device;

obtaining a live video stream; and sending the live video stream to the network access device by using the first short-range wireless communications connection, so that the network access device forwards the live video stream to a barrage video system on a network side.

According to one of the embodiments, a barrage video live broadcast method is provided, used in a network access device, and including:

establishing a first short-range wireless communications connection to a video source device;

receiving a live video stream sent by the video source device by using the first short-range wireless communications connection; and forwarding the live video stream to a barrage video system on a network side.

According to one of the embodiments, a video source device is provided, including:

one or more processors; and a memory; and one or more programs being stored in the memory, the one or more programs being configured to be executed by the one or more processors, and including an instruction used for performing the following operations:

establishing a first short-range wireless communications connection to a network access device;

obtaining a live video stream; and sending the live video stream to the network access device by using the first short-range wireless communications connection, so that the network access device forwards the live video stream to a barrage video system on a network side.

According to one of the embodiments, a network access device is provided, including:

one or more processors; and a memory; and one or more programs being stored in the memory, the one or more programs being configured to be executed by the one or more processors, and including an instruction used for performing the following operations:

establishing a first short-range wireless communications connection to a video source device;

receiving a live video stream sent by the video source device by using the first short-range wireless communications connection; and forwarding the live video stream to a barrage video system on a network side.

According to a one of the embodiments, a barrage video live broadcast apparatus is provided, used in a video source device, and including:

a first connection establishment module, configured to establish a first short-range wireless communications connection to a network access device;

a video stream obtaining module, configured to obtain a live video stream; and a sending module, configured to send the live video stream to the network access device by using the first short-range wireless communications connection, so that the network access device forwards the live video stream to a barrage video system on a network side.

According to one of the embodiments, a barrage video live broadcast apparatus is provided, used in a network access device, and including:

a third connection establishment module, configured to establish a first short-range wireless communications connection to a video source device;

a receiving module, configured to receive a live video stream sent by the video source device by using the first short-range wireless communications connection; and a forwarding module, configured to forward the live video stream to a barrage video system on a network side.

The technical solutions provided in the embodiments of the present disclosure bring the following advantageous effects:

A first short-range wireless communications connection is established between a network access device and a video source device, a live video stream is obtained, and is sent to the network access device from the video source device by the first short-range wireless communications connection. The network access device forwards the live video stream to a barrage video system on a network side. The network access device forwards a live video stream from the video source device to a barrage video system on the network side without a fixed video capture device and a fixed video capture device network access connection, to meet a live broadcast demand in a movement scenario, thereby extending live broadcast application scenarios of the barrage video.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
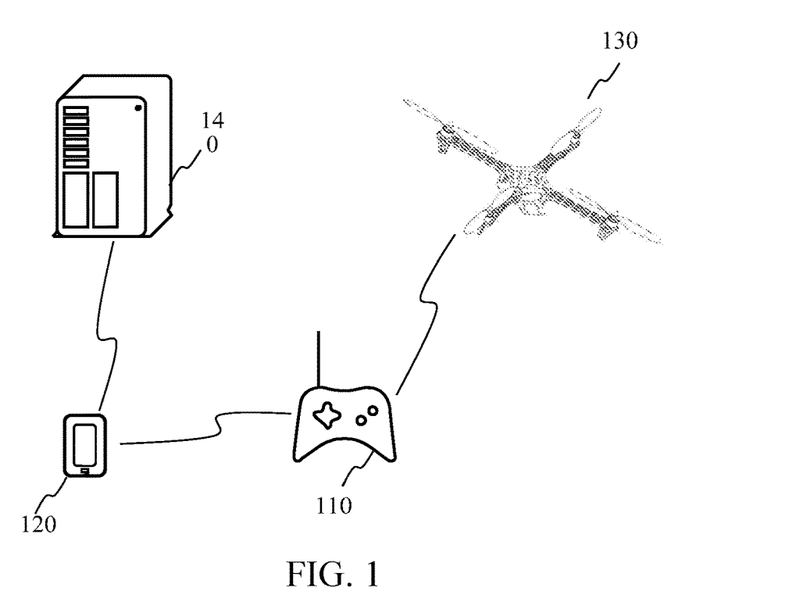
FIG. 1 is a diagram of an implementation environment of a barrage video live broadcast method according to some embodiments of the present disclosure.

Referring to FIG. 1, FIG. 1 is a diagram of an implementation environment of a barrage video live broadcast method according to some embodiments of the present disclosure. The implementation environment shown in FIG. 1 includes: a video source device 110, a network access device 120, and a barrage video system 140. Optionally, the implementation environment may further include a separate video capture device 130 (e.g., an unmanned aerial vehicle, a dronestagram).

The video source device 110 may be a device having a video capture function, for example, a dolly camera or a sports camera. Alternatively, the video source device 110 may be connected to the video capture device 130, and obtain a video captured by the video capture device 130. For example, the video capture device 130 may be an aerial camera, and the video source device 110 may be a remote control of the aerial camera.

The network access device 120 may be an electronic device having an Internet access capability, for example, a smartphone, a tablet computer, an ebook reader, or a portable mobile Wireless Fidelity (Wi-Fi) device.

The barrage video system 140 may be formed by a server on a network side. The server may be a separate server, may be a server cluster formed by multiple servers, or may be a cloud service center. In the embodiments shown in the present disclosure, the barrage video system 140 may obtain a live video from the video source device 110, and provide video play and barrage interaction service to a user terminal connected to the barrage video system 140. Specifically, when using the user terminal to play the live video provided by the barrage video system 140, a user may publish a barrage for the current live video, for example, publish a live comment in a form of text message. The barrage video system 140 receives the text message published by using the user terminal, adds the text message to a subsequent video stream of the live video, and pushes the video stream to each user terminal playing the live video. The live video played by each user terminal can display the text.

Figure 2:
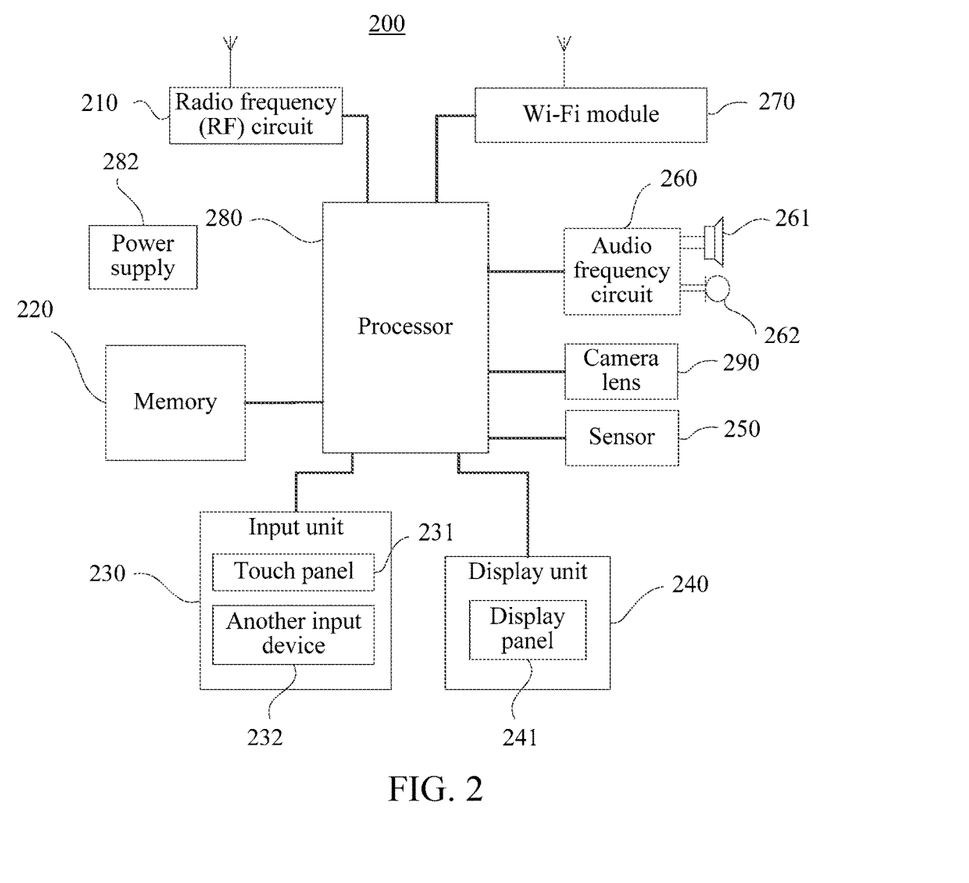
FIG. 2 is a structural block diagram of a terminal according to an embodiment of the present disclosure.

Referring to FIG. 2, FIG. 2 is a structural block diagram of a terminal according to an embodiment of the present disclosure. The terminal in this embodiment of the present disclosure may include one or more of the following parts: a processor configured to execute computer program instructions to implement various processes and methods, a random access memory (RAM) and a read-only memory (ROM) that are configured to store information and program instructions, a memory configured to store data and information, an input/output (I/O) device, an interface, an antenna, and the like.

A terminal 200 may include parts such as a radio frequency (RF) circuit 210, a memory 220, an input unit 230, a display unit 240, a sensor 250, an audio frequency circuit 260, a Wi-Fi module 270, a processor 280, a power supply 282, and a camera lens 290. A person skilled in the art may understand that, the terminal structure shown in FIG. 2 does not limit the structure, and may include more or less parts than illustrated in FIG. 2, combine some parts, or use a different part layout.

The following provides a specific description of the parts of the terminal 200 with reference to FIG. 2.

The RF circuit 210 may be configured to receive and send a signal during receiving/sending information or a call. Particularly, the RF circuit 210 sends downlink information to the processor 280 for processing after receiving the downlink information from a base station. In addition, the RF circuit 210 sends designed uplink data to the base station. The RF circuit usually includes, but is not limited to, an antenna, at least one amplifier, a transceiver, a coupler, a low noise amplifier (LNA), a duplexer, and the like. In addition, the RF circuit 210 may further communicate with a network and another device by means of wireless communication. The wireless communication may use any communications standard or protocol, including but is not limited to, Global System of Mobile Communication (GSM), General Packet Radio Service (GPRS), Code Division Multiple Access (CDMA), Wideband Code Division Multiple Access (WCDMA), Long Term Evolution (LTE), an email, or a short messaging service (SMS).

The memory 220 may be configured to store software programs and modules, and processor 280 performs various functions and data processing of the terminal 200 by running the software programs and the module stored in the memory 220. The memory 220 may mainly include a program storage area and a data storage area. The program storage area may store an operating system, an application needed by at least one function (for example, a sound playback function or image playback function), and the like. The data storage area may store data (for example, audio data and a phone book) created according to use of the terminal 200 and the like. In addition, the memory 220 may include a high-speed random access memory, or may include a non-transitory computer readable storage medium, for example, at least one magnetic disk storage device, a flash storage device, or another non-volatile solid state storage device for storing one or more programs to be executed by the processor 280 to perform predefined operations.

The input unit 230 may be configured to receive input digital or character information, and generate a key signal input that is related to user settings and function control of the terminal 200. Specifically, the input unit 230 may include a touch panel 231 and another input device 232. The touch panel 231 is also referred to as a touchscreen, may collect a touch operation that is performed by a user on or near the touch panel 231 (for example, an operation that is performed by a user by using any appropriate object or accessory such as a finger or a stylus on or near the touch panel 231), and drive a corresponding connection apparatus according to a preset program. Optionally, the touch panel 231 may include a touch detection apparatus and a touch controller. The touch detection apparatus detects a touch position of the user, detects a signal caused by the touch operation, and transmits the signal to the touch controller. The touch controller receives touch information from the touch detection apparatus, converts the touch information into a touch point coordinate, sends the touch point coordinate to the processor 280, and can receive an instruction from the processor 280 and execute the instruction. In addition, the touch panel 231 may be implemented by using multiple types of panels such as a resistive type, a capacitive type, an infrared type, and a surface acoustic wave type. In addition to the touch panel 231, the input unit 230 may further include the another input device 232. Specifically, the another input device 232 may include, but is not limited to, one or more of a physical keyboard, a function key (for example, a volume control key and an on/off key), a trackball, a mouse, and an operating rod.

The display unit 240 may be configured to display information entered by the user or information provided to the user and various menus of the terminal 200. The display unit 240 may include a display panel 241. Optionally, a liquid crystal display (LCD), an organic light-emitting diode (OLED), or the like may be used to configure the display panel 241. Further, the touch panel 231 may cover the display panel 241. After detecting an operation on or near the touch panel 231, the touch panel 231 transmits the operation to the processor 280 to determine a type of the touch event. Subsequently, the processor 280 provides a corresponding visual output on the display panel 241 according to the type of the touch event. In FIG. 2, the touch panel 231 and the display panel 241 are used as two separate parts to implement input and output functions of the terminal 200. However, in some embodiments, the touch panel 231 and the display panel 241 may be integrated to implement the input and output functions of the terminal 200.

The terminal 200 may further include at least one type of sensor 250, for example, a gyro sensor, a magnetic induction sensor, an optical sensor, a motion sensor, or another type of sensor. Specifically, the optical sensor may include an ambient light sensor and a proximity sensor. The ambient light sensor may adjust the luminance of the display panel 241 according to the brightness of an ambient light. The proximity sensor may turn off the display panel 241 and/or backlight when the sensor 200 moves to an ear. As a motion sensor, an acceleration sensor may detect an acceleration at any direction (usually three axes). When the acceleration sensor is stationary, the acceleration sensor may detect the size and direction of a gravity, may be configured to identify a posture of the terminal (for example, horizontal and vertical screen switching, a related game, or magnetometer posture calibration) and perform vibration identification of related functions (for example, a pedometer and knocking), and so on. The terminal 200 may alternatively be provided with another type of sensor such as a barometer, a hydrometer, a thermometer, or an infrared sensor, and details are not described herein.

The audio frequency circuit 260, a speaker 261, and a microphone 262 may provide an audio frequency interface between the user and the terminal 200. The audio frequency circuit 260 may convert received audio frequency data into an electrical signal, and transmit the electrical signal to the speaker 261. The speaker 261 converts the electrical signal into an audio signal and outputs the audio signal. On the other side, the microphone 262 converts a collected audio signal into an electrical signal. The audio frequency circuit 260 receives the electrical signal and converts the electrical signal into audio frequency data, and outputs the audio frequency data to the processor 280 for processing. For example, the processed audio frequency data is sent to another terminal by using the RF circuit 210, or the audio frequency data is output to the memory 220 for further processing.

Wi-Fi is a short-range wireless transmission technology. The terminal 200 may assist the user in receiving and sending an email, browsing a web page, accessing streaming medium, and the like by using the Wi-Fi module 270. This provides wireless broadband Internet access to the user. FIG. 2 shows the Wi-Fi module 270, but it may be understood that, the Wi-Fi module 270 is not a necessary part of the terminal 200, and may be completely omitted as required without departing from the range of the disclosed essence.

The processor 280 is a control center of the terminal 200, connects each part of the whole terminal by using various interfaces and lines, and performs various functions and data processing of the terminal 200 by operating or executing the software programs and/or modules stored in the memory 220 and invoking the data stored in the memory 220, to perform overall monitoring of the terminal. Optionally, the processor 280 may include one or more processing units. Preferably, the processor 280 may integrate an application processor and a modem processor. The application processor mainly processes an operating system, a user interface, an application, and the like. The modem processor mainly processes wireless communication. It may be understood that, the modem process may alternatively be not integrated into the processor 280.

The terminal 200 may further include the power supply 282 (for example, a battery) supplying power to each part. Preferably, the power supply may be logically connected to the processor 280 by using a power supply management system, to implement functions such as charge, discharge, and power consumption management by using the power supply management system.

The camera lens 290 is usually formed by a lens, an image sensor, an interface, a digital signal processor, a CPU, a display screen, and the like. The lens is fixed above the image sensor, and a focusing may be changed by manually adjusting the lens. The image sensor is equivalent to films of a conventional camera, and is the heart of image capture of the camera lens. The interface is used to connect the camera lens to a main board of the terminal by using a flat cable, a board-to-board connector, and a spring-type connector, to send the captured image to the memory 220. The digital signal processor processes the captured image by using a mathematical operation, converts a captured analog image into a digital image, and sends the digital image to the memory 220 by using the interface.

Although not shown in FIG. 2, the terminal 200 may further include a Bluetooth module and the like, and details are not described herein.

In addition to the one or more processors 280, the terminal 200 may further include a memory and one or more programs. The one or more programs are stored in the memory, and are configured to be executed by the one or more processors, to implement the barrage video live broadcast method shown in the embodiments of the present disclosure.

The terminal 200 may be implemented as the video source device 110 or the network access device 120 in the implementation environment shown in FIG. 1.

Figure 3:
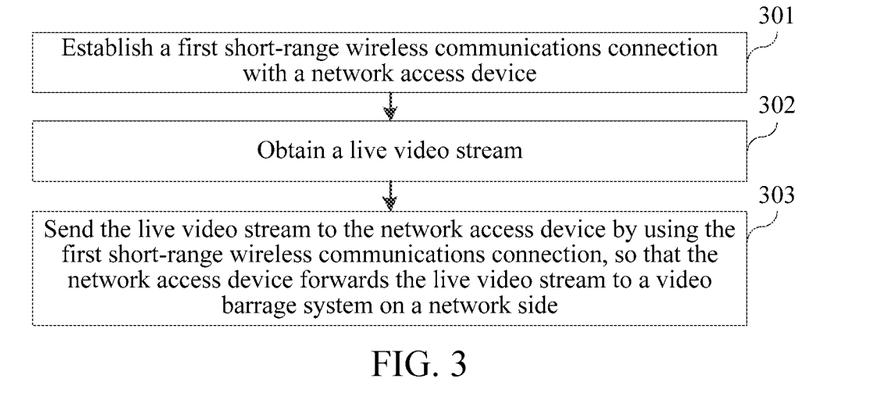
FIG. 3 is a flowchart of a barrage video live broadcast method according to an embodiment of the present disclosure.

Referring to FIG. 3, FIG. 3 is a flowchart of a barrage video live broadcast method according to an embodiment of the present disclosure. The barrage video live broadcast method may be applied to the video source device 110 in FIG. 1. The barrage video live broadcast method may include the following steps:

Step 301. Establish a first short-range wireless communications connection to a network access device.

Step 302. Obtain a live video stream.

Step 303. Send the live video stream to the network access device by using the first short-range wireless communications connection, so that the network access device forwards the live video stream to a barrage video system on a network side.

Based on the above, according to the barrage video live broadcast method provided in this embodiment of the present disclosure, a first short-range wireless communications connection is established with a network access device, a live video stream is obtained, and is sent to the network access device from the video source device 110 by using the first short-range wireless communications connection. The network access device forwards the live video stream to a barrage video system on a network side. A connection is established between a video source device and the network access device. The network access device forwards a video stream to a barrage video system on the network side without a fixed video capture device such as a camera device and a fixed video capture device network accessing connection, to meet a live broadcast demand in a movement scenario, thereby extending live broadcast application scenarios of the barrage video.

Figure 4:
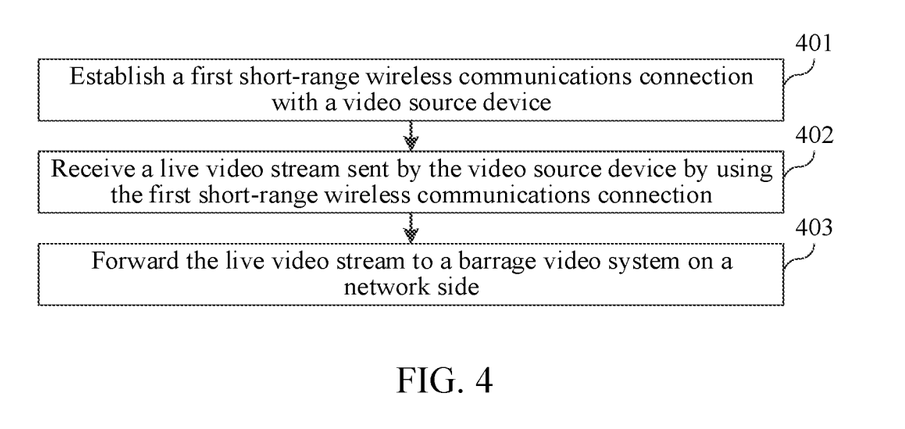
FIG. 4 is a flowchart of a barrage video live broadcast method according to an embodiment of the present disclosure.

Referring to FIG. 4, FIG. 4 is a flowchart of a barrage video live broadcast method according to an embodiment of the present disclosure. The barrage video live broadcast method may be applied to the network access device 120 in FIG. 1. The barrage video live broadcast method may include the following steps:

Step 401. Establish a first short-range wireless communications connection to a video source device.

Step 402. Receive a live video stream sent by the video source device by using the first short-range wireless communications connection.

Step 403. Forward the live video stream to a barrage video system on a network side.

Based on the above, according to the barrage video live broadcast method provided in this embodiment of the present disclosure, a first short-range wireless communications connection is established with a video source device, a live video stream sent by the video source device by using the first short-range wireless communications connection is received, and the live video stream is forwarded to a barrage video system on a network side. A connection is established between the video source device and a network access device. The network access device forwards a video stream to a barrage video system on the network side without a fixed video capture device such as a camera device and a video capture device network accessing connection, to meet a live broadcast demand in a movement scenario, thereby extending live broadcast application scenarios of the barrage video.

Figure 5:
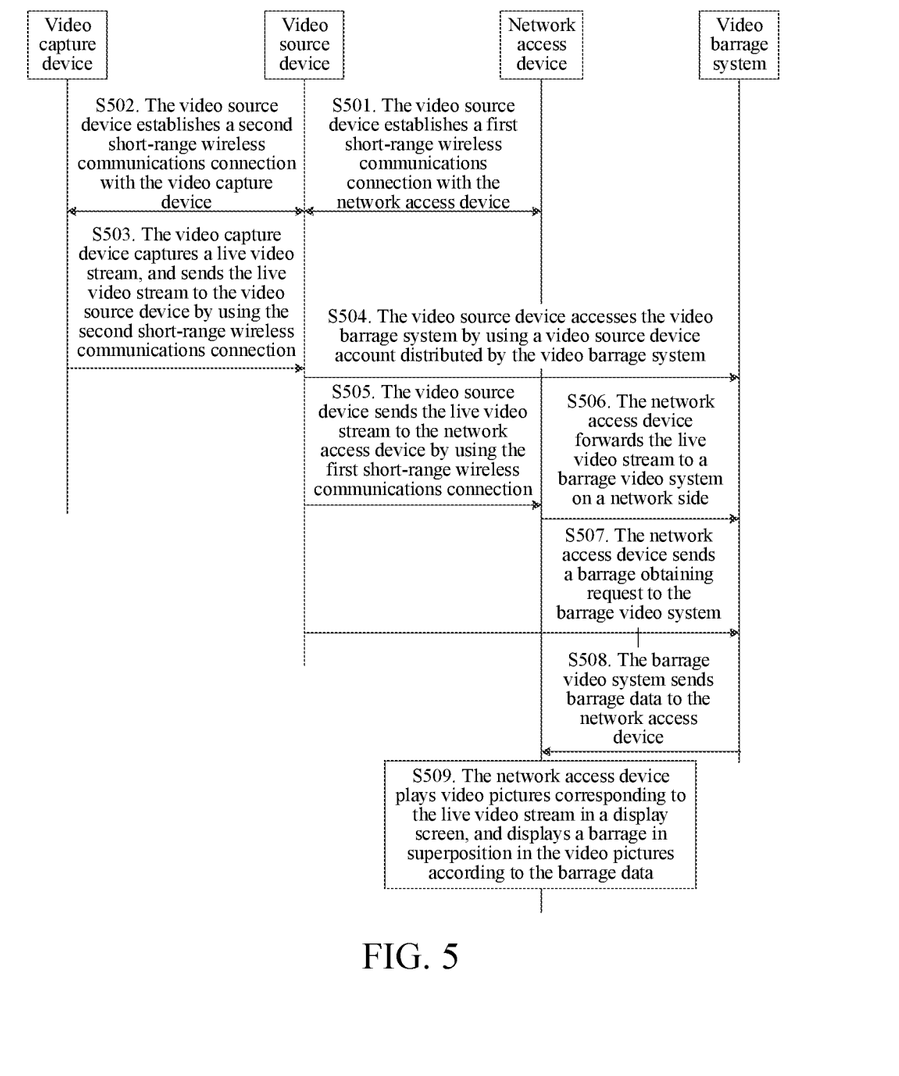
FIG. 5 is a flowchart of a barrage video live broadcast method according to an embodiment of the present disclosure.

Referring to FIG. 5, FIG. 5 is a flowchart of a barrage video live broadcast method according to an embodiment of the present disclosure. The barrage video live broadcast method may be applied to the implementation environment shown in FIG. 1. For example, the video capture device is an aerial camera, the video source device is a remote control, the network access device is a smartphone, and the video source device obtains a live video stream from the video capture device. The barrage video live broadcast method may include the following steps:

Step 501. The video source device establishes a first short-range wireless communications connection to the network access device.

The first short-range wireless communications connection may be a Wi-Fi Direct connection.

In this embodiment of the present disclosure, the network access device (for example, a smartphone) may access a network by using a communications manner such as Wi-Fi, the 3rd Generation mobile communication technology (3G), or the 4th Generation mobile communication technology (4G). To avoid a network conflict, a Wi-Fi Direction connection may be established between the video source device and the network access device. For example, when the video capture device is the aerial camera, the video source device is the remote control, and the network access device is the smartphone, a Wi-Fi Direct connection may be established between the remote control of the aerial camera and the smartphone.

Step 502. The video source device establishes a second short-range wireless communications connection to the video capture device.

In this embodiment of the present disclosure, the second short-range wireless communications connection may be a wireless communications connection at a user-defined frequency band.

For example, when the video capture device is the aerial camera, the video source device is the remote control, and the network access device is the smartphone, to reduce interference from a radio signal and ensure a transmission speed and accuracy of the live video stream, the wireless communication may be established between the aerial camera and the remote control according to the user-defined frequency band.

Step 503. The video capture device captures the live video stream, and sends the live video stream to the video source device by using the second short-range wireless communications connection.

For example, the video capture device is the aerial camera, when taking a video, the aerial camera sends the live video stream to the remote control in real time by using the wireless communications connection established according to the user-defined frequency band.

Step 504. The video source device accesses the barrage video system by using a video source device account distributed by the barrage video system.

The video source device may send an access request to the network access device. The access request includes the video source device account distributed by the barrage video system. The network access device sends the access request to the barrage video system. After receiving the access request, the barrage video system sends an access response to the network access device. The network access device forwards the access response to the video source device.

The video source device may first detect whether the video source device corresponds to a video source device account bound to the network access device. The video source device account is used for accessing the barrage video system. For example, the video source device may obtain device information (for example, read a specified configuration file in a cache) of the video source device, and inquires whether the video source device account is in the device information. If the video source device account is in the device information, the video source device further obtains an identification of the network access device, and detects whether a device identification bound to the video source device is the identification of the network access device. If yes, it is determined that the video source device corresponds to the video source device account bound to the network access device.

If the video source device corresponds to the video source device account bound to the network access device, the video source device directly accesses the barrage video system according to the video source device account. If the video source device does not correspond to the video source device account, or a device bound to an existing video source device account is not the network access device, the video source device may send an account distribution request to the network access device. The network access device sends the account distribution request to the barrage video system. The account distribution request is used to instruct the barrage video system to distribute the video source device account, and sends the video source device account to the network access device. The video source device receives the video source device account sent by the network access device, and accesses the barrage video system according to the video source device account. At the same time, the video source device may further locally establish a binding relationship between the video source device account and the network access device. In some embodiments, the barrage video system is associated with a social networking platform, e.g., an instant messaging application. The video source device account corresponds to a user account at the social networking platform. The barrage video system is configured to broadcast a live video stream among a group of user accounts of the social networking platform and live comments from the group of user accounts on the live video stream.

Optionally, the step of detecting whether the video source device corresponds to the video source device account bound to the network access device and the step of distributing the video source device account by using the barrage video system and accessing the barrage video system may both be implemented by the network access device.

When receiving the live video stream, the barrage video system needs to distinguish a source of the live video stream and live broadcast rights among a group of user accounts that have registered with the barrage video system. Therefore, a corresponding video source device account needs to be distributed for each video source device accessing the barrage video system. In this embodiment of the present disclosure, after establishing a Wi-Fi Direct connection with the smartphone, the remote control of the aerial camera first detects whether the remote control corresponds to the video source device account distributed by the barrage video system. If the remote control corresponds to the video source device account, the remote control further detects whether the video source device account is bound to the smartphone. If a detection result is that the remote control does not correspond to the video source device account distributed by the barrage video system, or the remote control corresponds to the video source device account distributed by the barrage video system but the video source device account is not bound to the smartphone, the remote control sends an account distribution request to the smartphone. The smartphone forwards the account distribution request to the barrage video system, and receives a video source device account that is distributed by the barrage video system for the remote control and that is forwarded by the smartphone. The remote control accesses a video live broadcast system by using the video source device account. If the detection result is that the remote control corresponds to the video source device account distributed by the barrage video system and the video source device account is bound to the smartphone, the remote control directly accesses the video live broadcast system by using the video source device account.

Alternatively, the solution may be led and executed by the smartphone. For example, after the remote control of the aerial camera establishes a Wi-Fi Direct connection with the smartphone, the smartphone obtains the device information of the remote control from the remote control, and detects, according to the device information, whether the remote control corresponds to the video source device account distributed by the barrage video system. If the remote control corresponds to the video source device account, the smartphone further detects whether the video source device account is bound to the smartphone. If a detection result is that the remote control does not correspond to the video source device account distributed by the barrage video system, or the remote control corresponds to the video source device account distributed by the barrage video system but the video source device account is not bound to the smartphone, the smartphone sends an account distribution request to the barrage video system, and receives a video source device account distributed by the barrage video system for the remote control. Then the smartphone accesses the video live broadcast system by using the video source device account. If the detection result is that the remote control corresponds to the video source device account distributed by the barrage video system and the video source device account is bound to the smartphone, the smartphone directly accesses the video live broadcast system by using the video source device account.

Step 505. The video source device sends the live video stream to the network access device by using the first short-range wireless communications connection.

In this embodiment of the present disclosure, the remote control sends the live video stream taken by the aerial camera to the smartphone by using the Wi-Fi Direct connection. In some embodiments, the remote control is connected to or has a built-in microphone for obtaining a live audio stream from the surrounding environment and merges the live audio stream into the live video stream before sending it to the smartphone. In some other embodiments, the smartphone is responsible for merging the live audio stream into the live video stream before sending it to the barrage video system.

Step 506. The network access device forwards the live video stream to a barrage video system on a network side.

In this embodiment of the present disclosure, the smartphone forwards the live video stream sent by the remote control to the barrage video system on the network side, so that the barrage video system provides live broadcast service of a barrage video according to the live video stream. Another user may obtain the live video stream and barrage data from the barrage video system by using a user terminal such as a smartphone, a tablet computer, or a personal computer.

Step 507. The network access device sends a barrage obtaining request to the barrage video system.

Step 508. The barrage video system sends barrage data to the network access device.

Step 509. The network access device plays video pictures corresponding to the live video stream in a display screen, and displays a barrage on the video pictures according to the barrage data. In some embodiments, the barrage is a short comment submitted by a user that is watching the live video stream on its own terminal. For example, this live video stream is captured by a video camera mounted on an unmanned aerial vehicle and broadcast live to members of a chat group (e.g., classmates, coworkers, and friends, etc.). A member can send a short message comment to the chat group. Since the other members of the chat group are probably watching the live video stream displayed on their terminals, it is more convenient to display the short message on the live video stream rather than outside the live video stream. In some embodiments, the short message lasts for a predefined amount of time, which is either fixed or varied based on its length, and then disappears.

Optionally, the network access device may further receive barrage data entered by the user, and sends the barrage data entered by the user to the barrage video system. In some embodiments, the user of the video source device (e.g., the remote control) and the network access device (e.g., the smartphone) can control the display of the barrage data such as live comments from other members of the chat group in many ways. For example, the video source device may receive a user instruction of specifying display locations of the live comments on the live video stream and forwards the user instruction to the barrage video system for displaying the live comments at the user-specified display locations, which can be a certain region of the live video stream or randomly-determined locations on the live video stream. Alternatively, the video source device may receive a user instruction of temporarily (e.g., for a few minutes) or permanently terminating the broadcast of the live comments from one or more user accounts of the barrage video system (e.g., some members of the chat group) if, e.g., their comments are deemed to be inappropriate and forward such user instruction to the barrage video system for execution through the network access device. In some embodiments, the video source device may receive a user instruction of temporarily limiting the broadcast of the live video stream to one or more user accounts of the barrage video system, e.g., a subset of members of the chat group that have submitted at least one live comment during a predefined time period (e.g., three minutes) and forward such user instruction to the barrage video system for execution through the network access device. By doing so, the other members of the chat group will be encouraged to become a more active participant of commenting on the live video stream. In some embodiments, the user of the video source device can direct the barrage video system not to send any comments to those terminals at which "silent" members of the chat group are watching the live video stream. At the end of the broadcast, the user of the video source device can send an instruction to the barrage video system to post, in the chat group, a link to the replay of the live video stream with live comments posted from members of the chat group.

In the solution shown in this embodiment of the present disclosure, in addition to that the network access device forwards the live video stream to the barrage video system, the network access device may further display the barrage video in the display screen of the network access device. For example, the remote control sends the live video stream to the smartphone. The smartphone may further display a live broadcast interface in the display screen of the smartphone while sending the live video stream to the barrage video system, to play video pictures corresponding to the live video stream in the live broadcast interface. At the same time, the smartphone may further request barrage data sent by the another user from the barrage video system, and display the barrage data in the video pictures. Meanwhile, the smartphone may further receive barrage data entered by the user by using a speech or a text, and send the barrage data entered by the user to the barrage video system, to implement barrage interaction between a person responsible for the live broadcast and audiences.

In another possible implementation manner, the video source device may send the barrage obtaining request to the barrage video system, the barrage video system sends the barrage data to the video source device by using the network access device. The video source device displays the video pictures corresponding to the live video stream in the display screen, and displays the barrage on the video pictures according to the barrage data. That is, in this embodiment of the present disclosure, the video source device may also have a display screen and an input port. The user may directly play the video pictures corresponding to the live video stream in the display screen of the video source device, and obtain the barrage data from the barrage video system. In addition, the video source device may further receive the barrage data entered by the user and sends the barrage data to the barrage video system.

It should be noted that, in this embodiment of the present disclosure, an example in which the video capture device is the aerial camera, the video source device is the remote control, the network access device is the smartphone, and the video source device obtains the live video stream from the video capture device is provided for description. During actual applications, the video source device may also have a video capture function, and the network access device is not only limited to the smartphone, may alternatively be an electronic device having a network access function, for example, a portable mobile Wi-Fi.

Based on the above, according to the barrage video live broadcast method provided in this embodiment of the present disclosure, a video source device establishes a first short-range wireless communications connection to a network access device, obtains a live video stream, and sends the live video stream to the network access device by using the first short-range wireless communications connection. The network access device forwards the live video stream to a barrage video system on a network side. A connection is established between the video source device and the network access device. The network access device forwards a video stream to a barrage video system on the network side without a fixed camera device and a camera device accessing a network, to meet a live broadcast demand in a movement scenario, thereby extending live broadcast scenarios of the barrage video.

The following provides an apparatus embodiment of the present disclosure, and may be used to perform method embodiments of the present disclosure. Refer to the method embodiments of the present disclosure for details of the apparatus embodiment of the present disclosure that are not disclosed.

Figure 6:
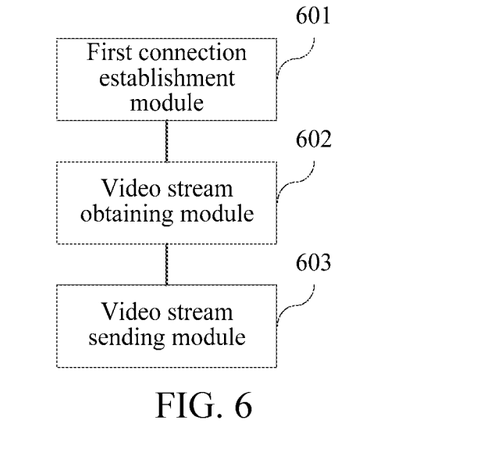
FIG. 6 is a structural diagram of a barrage video live broadcast apparatus according to an embodiment of the present disclosure.

Referring to FIG. 6, FIG. 6 is a structural diagram of a barrage video live broadcast apparatus according to an embodiment of the present disclosure. The barrage video live broadcast apparatus may be implemented as all or a part of the video source device 110 in the implementation environment shown in FIG. 1. The barrage video live broadcast apparatus 600 may include:

a first connection establishment module 601, configured to establish a first short-range wireless communications connection to a network access device;

a video stream video stream obtaining module 602, configured to obtain a live video stream; and a video stream sending module 603, configured to send the live video stream to the network access device by using the first short-range wireless communications connection, so that the network access device forwards the live video stream to a barrage video system on a network side.

Based on the above, according to the barrage video live broadcast apparatus provided in this embodiment of the present disclosure, a first short-range wireless communications connection is established with a network access device, a live video stream is obtained, and the live video stream is sent to the network access device by using the first short-range wireless communications connection. The network access device forwards the live video stream to a barrage video system on a network side. A connection is established between a video source device and the network access device. The network access device forwards a video stream to a barrage video system on the network side without a fixed camera device and a camera device accessing a network, to meet a live broadcast demand in a movement scenario, thereby extending live broadcast scenarios of the barrage video.

Figure 7:
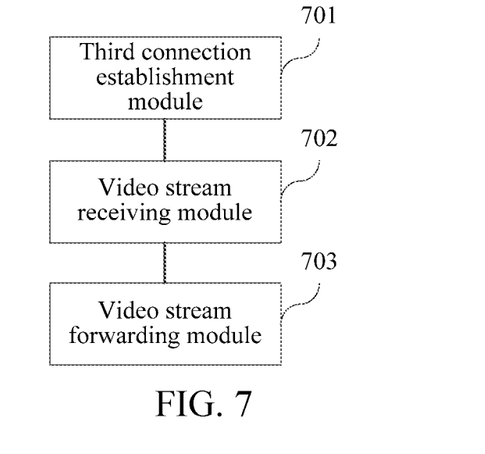
FIG. 7 is a structural diagram of a barrage video live broadcast apparatus according to an embodiment of the present disclosure.

Referring to FIG. 7, FIG. 7 is a structural diagram of a barrage video live broadcast apparatus according to an embodiment of the present disclosure. The barrage video live broadcast apparatus may be implemented as all or a part of the network access device 120 in the implementation environment shown in FIG. 1. The barrage video live broadcast apparatus 700 may include:

a third connection establishment module 701, configured to establish a first short-range wireless communications connection to a video source device;

a video stream receiving module 702, configured to receive a live video stream sent by the video source device by using the first short-range wireless communications connection; and a video stream forwarding module 703, configured to forward the live video stream to a barrage video system on a network side.

Based on the above, according to the barrage video live broadcast apparatus provided in this embodiment of the present disclosure, a first short-range wireless communications connection is established with a video source device, a live video stream sent by the video source device by using the first short-range wireless communications connection is received, and the live video stream is forwarded to a barrage video system on a network side. A connection is established between the video source device and a network access device. The network access device forwards a video stream to a barrage video system on the network side without a fixed camera device and a camera device accessing a network, to meet a live broadcast demand in a movement scenario, thereby extending live broadcast application scenarios of the barrage video.

Figure 8:
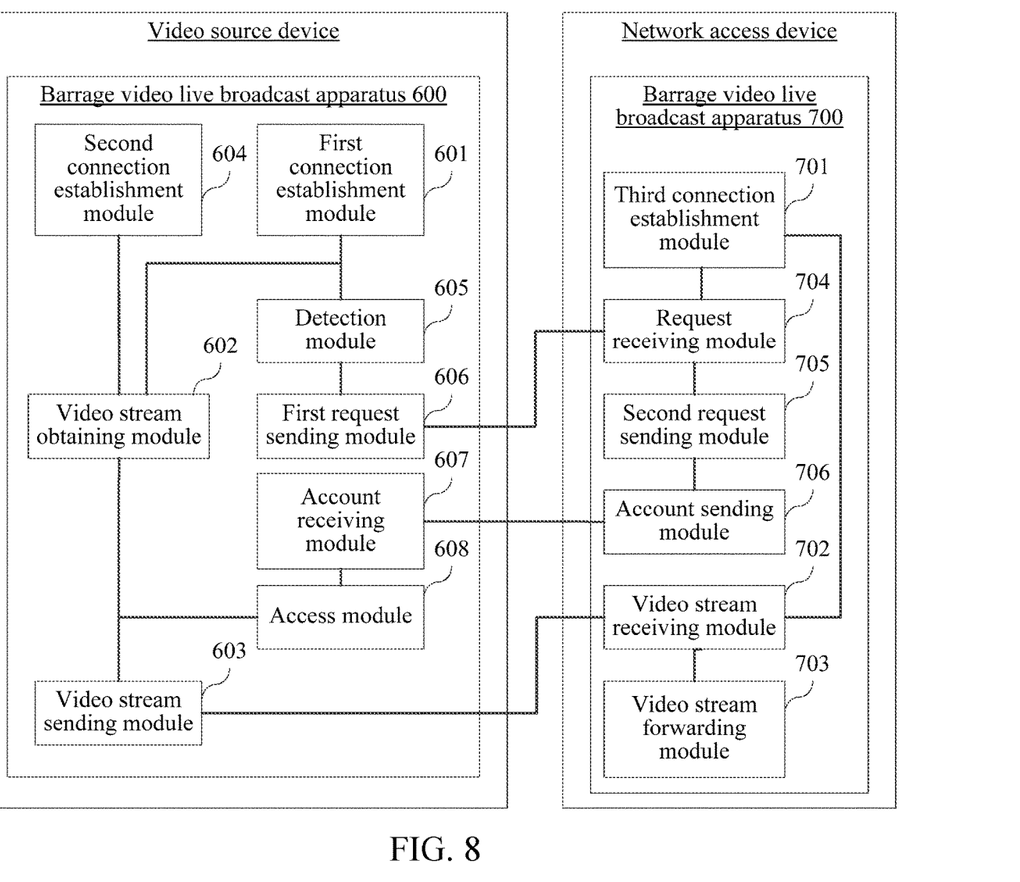
FIG. 8 is a structural diagram of a barrage video live broadcast system according to an embodiment of the present disclosure.

Referring to FIG. 8, FIG. 8 is a structural diagram of a barrage video live broadcast system according to an embodiment of the present disclosure. The barrage video live broadcast system may include all or a part of the video source device 110 and the network access device 120 that are in the implementation environment shown in FIG. 1. The barrage video live broadcast system may include a video source device including a barrage video live broadcast apparatus 600 and a network access device including a barrage video live broadcast apparatus 700.

The barrage video live broadcast apparatus 600 may include:

a first connection establishment module 601, configured to establish a first short-range wireless communications connection to a network access device;

a video stream video stream obtaining module 602, configured to obtain a live video stream; and a video stream sending module 603, configured to send the live video stream to the network access device by using the first short-range wireless communications connection, so that the network access device forwards the live video stream to a barrage video system on a network side.

Optionally, the barrage video live broadcast apparatus 600 further includes:

a second connection establishment module 604, configured to establish a second short-range wireless communications connection to a video capture device before the video stream obtaining module 602 obtains the live video stream; and the video stream video stream obtaining module 602 is configured to obtain the live video stream captured by the video capture device by using the second short-range wireless communications connection.

Optionally, the apparatus further includes:

a detection module 605, configured to detect, before the video stream module 603 sends the live video stream to the network access device by using the first short-range wireless communications connection, whether the video source device corresponds to a video source device account that is bound to the network access device and that is used for accessing the barrage video system;

a first request sending module 606, configured to send an account distribution request to the network access device if the video source device does not correspond to the video source device account, so that the network access device sends the account distribution request to the barrage video system, where the account distribution request is used to instruct the barrage video system to distribute the video source device account and send the video source device account to the network access device;

an account receiving module 607, configured to receive the video source device account sent by the network access device; and an access module 608, configured to access the barrage video system according to the video source device account.

Optionally, the first short-range wireless communications connection is a Wi-Fi Direct connection.

Optionally, the second short-range wireless communications connection is a wireless communications connection at a user-defined frequency band.

Optionally, the video capture device is an aerial camera, and the video source device is a remote control of the aerial camera.

The barrage video live broadcast apparatus 700 may include:

a third connection establishment module 701, configured to establish a first short-range wireless communications connection to a video source device;

a video stream receiving module 702, configured to receive a live video stream sent by the video source device by using the first short-range wireless communications connection; and a video stream forwarding module 703, configured to forward the live video stream to a barrage video system on a network side.

Optionally, the apparatus further includes:

a request receiving module 704, configured to receive an account distribution request before the video stream receiving module 702 receives the live video stream sent by the video source device by using the first short-range wireless communications connection, where the account distribution request is a request that is sent when the video source device detects that the video source device does not correspond to a video source device account that is bound to the network access device and that is used for accessing the barrage video system, and the account distribution request is used to instruct the barrage video system to distribute the video source device account and send the video source device account to the network access device;

a second request sending module 705, configured to send the account distribution request to the barrage video system; and an account sending module 706, configured to send the video source device account returned by the barrage video system to the video source device.

Based on the above, according to the barrage video live broadcast method provided in this embodiment of the present disclosure, a video source device establishes a first short-range wireless communications connection to a network access device, obtains a live video stream, and sends the live video stream to the network access device by using the first short-range wireless communications connection. The network access device forwards the live video stream to a barrage video system on a network side. A connection is established between the video source device and the network access device. The network access device forwards a video stream to a barrage video system on the network side without a fixed camera device and a camera device accessing a network, to meet a live broadcast demand in a movement scenario, thereby extending live broadcast application scenarios of the barrage video.

In an exemplary embodiment, a non-transitory computer readable storage medium including instructions is further provided, for example, a memory including instructions. The instructions may be executed by a processor in a mobile terminal to complete the barrage video live broadcast method shown in the embodiments of the present disclosure.

For example, the non-transitory computer readable storage medium may be a ROM, a random access memory (RAM), a CD-ROM, a magnetic tape, a floppy disk, an optical data storage device, or the like.

It should be noted that, when the barrage video live broadcast apparatus provided in this embodiment performs barrage video live broadcast, division of the functional modules is merely used as an example for description. During actual application, the functional allocation can be implemented by different functional modules according to needs. That is, an internal structure of the apparatus is divided into different functional modules to implement all of or a part of functions described above. In addition, the barrage video live broadcast apparatus and the barrage video live broadcast method provided in this embodiment belong to a same concept. Refer to the method embodiments for a specific implementation process, and details are not described herein again.

It should be understood that, unless an exception is clearly specified in the context, the singular form ("a", "an", and "the") used herein is intended to include the plural form. It should be further understood that, "and/or" used herein any or all possible combinations of one or more items that are listed in an associated manner.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method of barrage video live broadcast to a plurality of members of a chat group performed at a video source device having one or more processors and memory, the memory storing one or more programs to be executed by the one or more processors, the method comprising:

establishing a first short-range wireless communications connection from the video source device to a first mobile terminal distinct from the video source device, the first mobile terminal corresponding to a first member of the plurality of members of the chat group;

establishing a second short-range wireless communications connection from the video source device to a video capture device, wherein the video capture device is distinct from the video source device and from the first mobile terminal;

sending an account distribution request from the video source device to the first mobile terminal by using the first short-range wireless communications connection, wherein the account distribution request is used by the first mobile terminal to instruct a barrage video system to distribute a video source device account to the first mobile terminal, wherein the video source device account is used by other mobile terminals corresponding to the plurality of members of the chat group for accessing the barrage video system;

receiving information of the video source device account from the first mobile terminal and the other mobile terminals of the plurality of members of the chat group, and establishing a binding relationship between the video source device account, the first mobile terminal, and the other mobile terminals corresponding to the plurality of members of the chat group;

receiving a live video stream captured by the video capture device via the second short-range wireless communications connection;

sending the live video stream from the video source device to the first mobile terminal by using the first short-range wireless communications connection, wherein the first mobile terminal forwards the live video stream to the barrage video system and the barrage video system (i) broadcasts the live stream on the network access devices corresponding to the plurality of members of the chat group, (ii) receives live comments from the network access devices corresponding to the plurality of members of the chat group, and (iii) renders each of the live comments from the plurality of members of the chat group transiently at a pseudo-randomly-determined location on top of the live video stream;

receiving an instruction from a user of the video source device to limit broadcast of the live video stream to a subset of the plurality of members of the chat group that each have submitted at least one live comment during a predefined time period; and forwarding the user instruction to the barrage video system for execution, thereby causing the barrage video system to broadcast the live video stream on the network access devices corresponding to the subset of plurality of members of the chat group.

2. The method according to claim 1, further comprising:
obtaining a live audio stream from a microphone of the video source device; and
merging the live audio stream into the live video stream before sending the live video stream to the first mobile terminal.

3. The method according to claim 1, wherein the live comments are submitted from the plurality of members of the chat group that have registered with the barrage video system to watch the live video stream.

4. The method according to claim 3, further comprising:
receiving, from the user of the video source device, a user instruction of specifying display locations of the live comments on the live video stream; and
forwarding the user instruction to the barrage video system for displaying the live comments at the user-specified display locations on the live video stream.

5. The method according to claim 3, further comprising:
receiving, from the user of the video source device, a user instruction to terminate broadcast of the live comments from one or more members of the plurality of members of the chat group on the live video stream; and
forwarding the user instruction to the barrage video system for terminating the broadcast of the live comments from the one or more members of the chat group on the live video stream.

6. The method according to claim 3, further comprising:
receiving, from the user of the video source device, a user instruction of limiting the broadcast of the live video stream to one or more members of the plurality of members of the chat group; and forwarding the user instruction to the barrage video system for limiting the broadcast of the live comments to the one or more members of the chat group.

7. The method according to claim 1, wherein the live comments are forwarded to the video source device and displayed on the live video stream at the video source device.

8. The method according to claim 1, wherein the first short-range wireless communications connection is a Wireless Fidelity (Wi-Fi) Direct connection, and the second short-range wireless communications connection is a wireless communications connection at a user-defined frequency band.

9. The method according to claim 1, wherein the video capture device is an aerial camera mounted on an unmanned aerial vehicle, and the video source device is a remote control of the aerial camera.

10. A video source device, comprising:
one or more processors;
memory; and
one or more programs being stored in the memory, the one or more programs being configured to be executed by the one or more processors and cause the video source device to perform a plurality of operations including:
establishing a first short-range wireless communications connection from the video source device to a first mobile terminal distinct from the video source device, the first mobile terminal corresponding to a first member of the plurality of members of the chat group;
establishing a second short-range wireless communications connection from the video source device to a video capture device, wherein the video capture device is distinct from the video source device and from the first mobile terminal;
sending an account distribution request from the video source device to the first mobile terminal by using the first short-range wireless communications connection, wherein the account distribution request is used by the first mobile terminal to instruct a barrage video system to distribute a video source device account to the first mobile terminal, wherein the video source device account is used by other mobile terminals corresponding to the plurality of members of the chat group for accessing the barrage video system;
receiving information of the video source device account from the first mobile terminal and the other mobile terminals of the plurality of members of the chat group, and establishing a binding relationship between the video source device account, the first mobile terminal, and the other mobile terminals corresponding to the plurality of members of the chat group;
receiving a live video stream captured by the video capture device via the second short-range wireless communications connection;
sending the live video stream from the video source device to the first mobile terminal by using the first short-range wireless communications connection, wherein the first mobile terminal forwards the live video stream to the barrage video system and the barrage video system (i) broadcasts the live stream on the network access devices corresponding to the plurality of members of the chat group, (ii) receives live comments from the network access devices corresponding to the plurality of members of the chat group, and (iii) renders each of the live comments from the plurality of members of the chat group transiently at a pseudo-randomly-determined location on top of the live video stream;

receiving an instruction from a user of the video source device to limit broadcast of the live video stream to a subset of the plurality of members of the chat group that have submitted at least one live comment during a predefined time period; and forwarding the user instruction to the barrage video system for execution, thereby causing the barrage video system to broadcast the live video stream on the network access devices corresponding to the subset of plurality of members of the chat group.

11. The video source device according to claim 10, wherein the plurality of operations further comprises:

obtaining a live audio stream from a microphone of the video source device, wherein the live video stream is a video stream captured by the video capture device; and merging the live audio stream into the live video stream before sending the sending the live video stream to the first mobile terminal.

12. The video source device according to claim 10, wherein the live comments are submitted from the plurality of members of the chat group that have registered with the barrage video system to watch the live video stream.

13. The video source device according to claim 12, wherein the plurality of operations further comprises:

receiving, from the user of the video source device, a user instruction of specifying display locations of the live comments on the live video stream; and forwarding the user instruction to the barrage video system for displaying the live comments at the user-specified display locations on the live video stream.

14. The video source device according to claim 12, wherein the plurality of operations further comprises:

receiving, from the user of the video source device, a user instruction to terminate broadcast of the live comments from one or more members of the plurality of members of the chat group on the live video stream; and forwarding the user instruction to the barrage video system for terminating the broadcast of the live comments from the one or more members on the live video stream.

15. The video source device according to claim 12, wherein the plurality of operations further comprises:

receiving, from the user of the video source device, a user instruction of limiting the broadcast of the live video stream to one or more members of the plurality of members of the chat group; and forwarding the user instruction to the barrage video system for limiting the broadcast of the live comments to the one or more members.

16. The video source device according to claim 10, wherein the live comments are forwarded to the video source device and displayed on the live video stream at the video source device.

17. The video source device according to claim 10, wherein the first short-range wireless communications connection is a Wireless Fidelity (Wi-Fi) Direct connection, and the second short-range wireless communications connection is a wireless communications connection at a user-defined frequency band.

18. The video source device according to claim 10, wherein the video capture device is an aerial camera mounted on an unmanned aerial vehicle, and the video source device is a remote control of the aerial camera.

19. A non-transitory computer readable storage medium storing one or more programs, wherein the one or more programs are configured to be executed by one or more processors of a video source device and cause the video source device to perform a plurality of operations including:

establishing a first short-range wireless communications connection from the video source device to a first mobile terminal distinct from the video source device, the first mobile terminal corresponding to a first member of the plurality of members of the chat group;

establishing a second short-range wireless communications connection from the video source device to a video capture device, wherein the video capture device is distinct from the video source device and from the first mobile terminal;

sending an account distribution request from the video source device to the first mobile terminal by using the first short-range wireless communications connection, wherein the account distribution request is used by the first mobile terminal to instruct a barrage video system to distribute a video source device account to the first mobile terminal, wherein the video source device account is used by other mobile terminals corresponding to the plurality of members of the chat group for accessing the barrage video system;

receiving information of the video source device account from the first mobile terminal and the other mobile terminals of the plurality of members of the chat group, and establishing a binding relationship between the video source device account, the first mobile terminal, and the other mobile terminals corresponding to the plurality of members of the chat group;

receiving a live video stream captured by the video capture device via the second short-range wireless communications connection;

sending the live video stream from the video source device to the first mobile terminal by using the first short-range wireless communications connection, wherein the first mobile terminal forwards the live video stream to the barrage video system and the barrage video system (i) broadcasts the live stream on the network access devices corresponding to the plurality of members of the chat group, (ii) receives live comments from the network access devices corresponding to the plurality of members of the chat group, and (iii) renders each of the live comments from the plurality of members of the chat group transiently at a pseudo-randomly-determined location on top of the live video stream;

receiving an instruction from a user of the video source device to limit broadcast of the live video stream to a subset of the plurality of members of the chat group that each have submitted at least one live comment during a predefined time period; and forwarding the user instruction to the barrage video system for execution, thereby causing the barrage video system to broadcast the live video stream on the network access devices corresponding to the subset of plurality of members of the chat group.

20. The non-transitory computer readable storage medium according to claim 19, wherein the plurality of operations further comprises:

obtaining a live audio stream from a microphone of the video source device; and merging the live audio stream into the live video stream before sending the live video stream to the first mobile terminal.

\* \* \* \* \*